US012750211B2

(12) United States Patent
Liu et al.

(10) Patent No.: US 12,750,211 B2
(45) Date of Patent: Sep. 29, 2026

(54) CYBERTWIN-BASED METHOD FOR CONSTRUCTING TWO-LAYER FEDERATED LEARNING FRAMEWORK FOR INTERNET OF VEHICLES

(71) Applicant: Guangdong University of Technology, Guangzhou (CN)

(72) Inventors: Chang Liu, Guangzhou (CN); Jiacheng Xu, Guangzhou (CN); Hongmin Wei, Guangzhou (CN); Guojun Han, Guangzhou (CN); Yi Fang, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 19/308,159

(22) Filed: Aug. 22, 2025

(65) Prior Publication Data

US 2025/0392452 A1 Dec. 25, 2025

Related U.S. Application Data

(63) Continuation of application No. PCT/CN2025/086295, filed on Mar. 31, 2025.

(51) Int. Cl.
*H04L 9/08* (2006.01)
*G06N 20/00* (2019.01)

(52) U.S. Cl.
CPC ............ *H04L 9/083* (2013.01); *G06N 20/00* (2019.01); *H04L 2209/84* (2013.01)

(58) Field of Classification Search
CPC ..... H04L 9/083; H04L 67/12; H04L 2209/84; H04W 4/44; G06N 3/098; G06N 20/00; G06F 21/64; Y02T 10/40
See application file for complete search history.

(56) References Cited

U.S. PATENT DOCUMENTS

| | | | | |
|---|---|---|---|---|
| 12,175,338 B2 * | 12/2024 | Zhou | ...................... | G06N 3/098 |
| 2021/0188306 A1 * | 6/2021 | Himayat | ............... | B60W 60/00 |

(Continued)

FOREIGN PATENT DOCUMENTS

| | | |
|---|---|---|
| CN | 112348201 A | 2/2021 |
| CN | 113435472 A | 9/2021 |

(Continued)

OTHER PUBLICATIONS

X. Su, Y. Huo, X. Wang and T. Jing, "An Enhancing Semi-Supervised Federated Learning Framework for Internet of Vehicles," 2023 IEEE 98th Vehicular Technology Conference (VTC2023-Fall), Hong Kong, Hong Kong, 2023, pp. 1-5 (Year: 2023).*

*Primary Examiner* — Amir Mehrmanesh
*Assistant Examiner* — Thomas A Gyorfi

(57) ABSTRACT

Disclosed is a cybertwin-based method for constructing a two-layer federated learning framework for internet of vehicles, including constructing a two-layer federated learning system for internet of vehicles, dividing a cybertwin network framework into three layers: a central cloud server, an edge cloud server j and a vehicle device i, with the central cloud server attached to a server preset in the central cloud server, and the edge cloud server j attached to a roadside unit preset in the vehicle device i. According to the method, federated learning scenarios are expanded, and more applicable and capable of resisting more backdoor attacks.

20 Claims, 1 Drawing Sheet

(56) References Cited

U.S. PATENT DOCUMENTS

| | | | | |
|---|---|---|---|---|
| 2023/0110310 | A1 | 4/2023 | Ucar et al. | |
| 2024/0028950 | A1* | 1/2024 | Saha | G06N 3/0464 |
| 2024/0104427 | A1* | 3/2024 | Wang | G06N 3/08 |
| 2024/0126836 | A1* | 4/2024 | Gao | G06N 20/00 |
| 2024/0127105 | A1* | 4/2024 | Chen | G06V 20/56 |
| 2024/0256891 | A1* | 8/2024 | Wang | G06N 3/084 |
| 2024/0265296 | A1* | 8/2024 | Gao | G06N 20/00 |
| 2024/0330706 | A1* | 10/2024 | Pompili | G06N 3/045 |
| 2025/0238711 | A1* | 7/2025 | Wang | G06N 20/00 |

FOREIGN PATENT DOCUMENTS

| | | | |
|---|---|---|---|
| CN | 115310121 | A | 11/2022 |
| CN | 116489642 | A | 7/2023 |

* cited by examiner

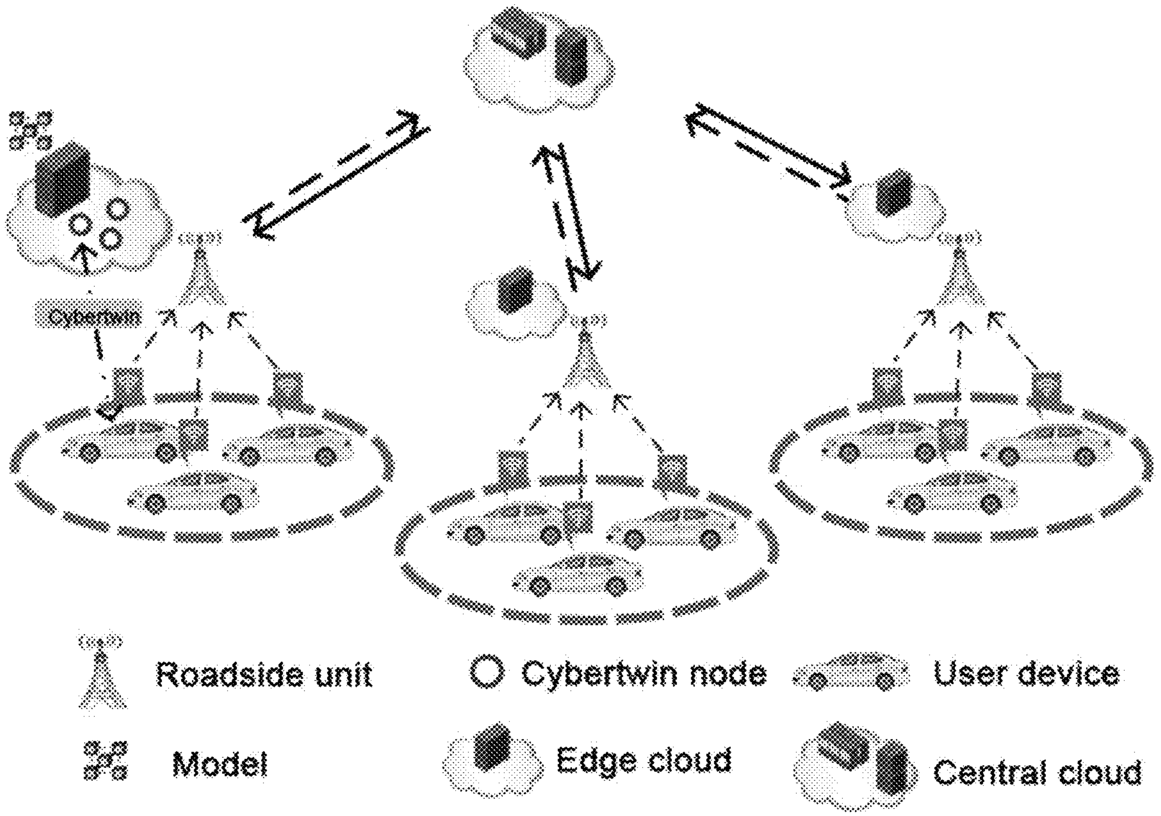
Cybertwin
Roadside unit
Cybertwin node
User device
Model
Edge cloud
Central cloud

CYBERTWIN-BASED METHOD FOR CONSTRUCTING TWO-LAYER FEDERATED LEARNING FRAMEWORK FOR INTERNET OF VEHICLES

CROSS-REFERENCE TO RELATED APPLICATIONS

This application is a continuation of PCT/CN2025/086295, filed on Mar. 31, 2025 and claims priority of Chinese Patent Application No. 202410393035.X, filed on Apr. 2, 2024, the entire contents of which are incorporated herein by reference.

TECHNICAL FIELD

The disclosure relates to the technical field of federated learning, and specifically relates to a cybertwin-based method for constructing a two-layer federated learning framework for internet of vehicles.

BACKGROUND

The industry is an important field for the application of the Internet of Things. As science and technology develop constantly, the internet of vehicles has become synonymous with intelligent manufacturing and industry 4.0. A variety of advanced intelligent technologies, such as artificial intelligence (AI), machine learning, augmented/virtual reality (AR/VR), digital twin/thread, and cloud/edge computing, are continuously integrated into various links of industrial production.

As an important development trend in the future of the transportation sector, intelligent vehicles are facing numerous challenges to achieve fully autonomous driving. One of the challenges is how to acquire vehicle data for model training. Intelligent vehicles acquire perceptual information via many sensors (such as cameras, laser radar, ultrasonic sensors, radar, and GPS). The camera is capable of generating several megabytes of data per second. Directly uploading all perceptual data would result in enormous communication load and network resource consumption, as well as privacy issues. Therefore, the existing researchers provide a distributed federated learning scheme, which uses the model crowdsourcing concept for the internet of vehicles to train large models for intelligent vehicles. Federated learning allows a plurality of vehicle devices to collaboratively train a shared global model according to local training data, and the central cloud server aggregates all local model parameters to generate an improved global model, to reduce network resource consumption and protect the privacy of vehicle devices. To achieve this objective, the existing researchers provide a two-layer federated learning aggregation framework based on a cybertwin network framework.

The cybertwin network framework provides three primary functions: communication aid, data logger, and digital asset, to support model crowdsourcing training. The communication aid function ensures the accuracy of vehicle identities in the environment of internet of vehicles. The data logger function optimizes traffic flow control and road maintenance strategies by analyzing vehicle data. The digital asset function ensures the security and integrity of model data by combining digital encryption and blockchain technology, and endows the model data with a certain value. These functions provide theoretical basis and functional support for model crowdsourcing.

However, there are challenges in aggregating large models via model crowdsourcing. Factors such as distributed cyberattacks, different computing powers and data structures, high dynamics of vehicles, limited communication bandwidth, and intermittent connectivity can all impact the aggregation and iteration of a global model.

SUMMARY

Given the above-described shortcomings in the prior art, the disclosure provides a cybertwin-based method for constructing a two-layer federated learning framework for internet of vehicles. The two-layer federated learning aggregation based on a cybertwin network framework is capable of expanding the tolerance ratio for malicious nodes and countering diverse backdoor attacks, and is effective in various vehicle scenarios.

To realize the above effects, the technical solutions of the disclosure are as follows.

In a first aspect, the disclosure provides a cybertwin-based method for constructing a two-layer federated learning framework for internet of vehicles, which includes deploying an edge cloud server j between a vehicle device i and a central cloud server to build a two-layer federated learning system for internet of vehicles; the vehicle device i, the edge cloud server j and the central cloud server collaborating to complete model training; and the vehicle device i, the edge cloud server j and the central cloud server being communicated via a wireless link; and specifically includes the following steps.

Step 1: a two-layer federated learning system for internet of vehicles is constructed, and a cybertwin network framework of a federated learning model for the internet of vehicles is divided into three layers: the central cloud server, the edge cloud server j and the vehicle device i, with the central cloud server attached to a server preset in the central cloud server, and the edge cloud server j attached to a roadside unit preset in the vehicle device i;

the central cloud server signs with its preset private key $S_G$, encrypts a global model $\omega^t$ at a time t with a preset public key $P_j$ corresponding to the edge cloud server j, and sends same to the edge cloud server j; and the edge cloud server j decrypts an encrypted global model $\omega^t$ at the time t with its preset private key $S_j$ to obtain a decrypted global model $\omega^t$, ensuring the communication security between the edge cloud server j and the central cloud server; and each edge cloud server j collects a list $$N_j^t = \{1, 2, 3, \ldots, i\}$$

of the vehicle device i and sends the global model $\omega^t$ to the vehicle device i.

Step 2: the vehicle device i trains a local model $$\omega_i^t$$

using a local dataset and sends same to the edge cloud server j, the edge cloud server j acquires a historical behavior of the vehicle device i by calculating a contribution degree score of the local model $$\omega_i^t$$

and by a cybertwin node, and the local model $$\omega_i^t$$

that does not meet in requirements of a preset model is discarded, to obtain an edge cloud model $$\omega_i^{t+1}$$

at time t+1; the local model $$\omega_i^t$$

that does not meet the requirements of the preset model is: the local model $$\omega_i^t$$

not within a preset historical behavior, or, the local model $$\omega_i^t$$

not within a preset contribution degree score, or, the local model $$\omega_i^t$$

not within a preset quality;

the vehicle device i signs with the private key $S_i$, encrypts the local model at the $$\omega_i^{t+1}$$

at the time t+1 with a public key $P_G$ corresponding to the edge cloud server j, and sends same to the roadside unit;

the edge cloud server j obtains a local model set $$\{\omega_1^{t+1}, \omega_2^{t+1}, \omega_3^{t+1}, \ldots, \omega_i^{t+1}\}$$

submitted by the vehicle device i within a range of the roadside unit, and aggregates the local model set $$\{\omega_1^{t+1}, \omega_2^{t+1}, \omega_3^{t+1}, \ldots, \omega_i^{t+1}\}$$

to obtain a model $$\omega_j^{t+1}$$

of the edge cloud server j at the time t+1; and the edge cloud server j signs with its private key $S_j$, encrypts the local model $$\omega_j^{t+1}$$

with the public key $P_G$ of the central cloud server, and sends same to the central cloud server.

Step 3: the central cloud server aggregates a received local model $$\{\omega_1^{t+1}, \omega_2^{t+1}, \omega_3^{t+1}, \ldots, \omega_j^{t+1}\}$$

to obtain a global model $\omega^{t+1}$ at the time t+1.

Step 4: steps 1-3 are repeated until the end of a global iteration, to obtain a final global model $\omega^T$.

The vehicle device i in the disclosure can be devices of Internet of Things such as a vehicle, and i represents the $i_{th}$ vehicle. In the disclosure, various backdoor attacks are defended by designing an efficient and secure aggregation algorithm and the two-layer federated learning framework based on the cybertwin framework.

Furthermore, the local dataset for training in step 2 is generated by the vehicle device i via information acquisition; and to reduce a transmission pressure of a backhaul link, the vehicle device i only communicates with the edge cloud server j, and the edge cloud server j can communicate with both the vehicle device i and the cloud server.

Furthermore, the vehicle device i training the local model $$\omega_i^t$$

using the local dataset in step 2 includes the following content:

assuming that a multi-classification task is currently carried out, the global model $\omega^0$, a learning rate $\eta$ of the vehicle device i, a local training epoch k, and a global iteration epoch T are initialized;

after receiving an initialized global model $\omega^0$, the vehicle device i trains the global model $\omega^0$ via a local dataset $(x_i, y_i)$ to obtain the local model $$\omega_i^{t+1}$$

at the time t+1, i.e., $$\omega_i^{t+1} = \omega^t - \eta \nabla 1[\omega^t; (x_i, y_i)];$$

and the edge cloud server j acquires the calculation capacity of the vehicle device i through the following formula:

$$C_i^{t+1} = \frac{a_i^{t+1} \cdot f_i^{t+1}\left(\omega_i^{t+1}; (x_i, y_i)\right)}{A^{t+1} \cdot D_i^{t+1}}$$

$$D_i^{t+1} = \frac{1}{2}[((x_i, y_i)\|M)_{KL} + ((x_j, y_j)\|M)_{KL}]$$

where $A^{t+1}$ represents a reference value of a data volume of the vehicle device i at the time t, $a^{t+1}$ represents a data volume of the vehicle device i at the time t+1;

$$f_i^{t+1}\left(\omega_i^{t+1}; (x_i, y_i)\right)$$

represents the model quality performance of the local model on a local test set; and $$D_i^{t+1}$$

represents a Jensen-Shannon (JS) divergence of test sets of the vehicle device i and the edge cloud server j.

Furthermore, after the vehicle device i trains the local model $$\omega_i^t$$

using the local dataset in step 2, the following is further included:

the quality of the local model of the vehicle device i is calculated through the following formula:

$$Q_i^{t+1} = \alpha \cdot C_i^{t+1} \cdot e^{loss_i^{t+1}} + (1-\alpha) \cdot e\left(\omega_i^{t+1}; \omega^t\right)$$

$$\text{loss}_i^{t+1} = \frac{\text{loss}\ \left(\omega_i^{t+1}; (x_j, y_j)\right) - \text{loss}\ (\omega^t; (x_j, y_j))}{\text{loss}\ (\omega^t; (x_j, y_j))}$$

$$e\left(\omega_j^{t+1}, \ldots, \omega_{i-1}^{t+1}, \omega_i^{t+1}\right) = \frac{1}{1 + e^{-2\left(cos\left(\omega_i^{t+1}, \omega^t\right)\right) - cos^t}}$$

where α represents a slippage factor;

$$\text{loss}_i^{t+1}$$

represents a contribution degree of the vehicle device i to the global model at the time t+1; and $$e\left(\omega_i^{t+1}; \omega^t\right)$$

represents a distance of the vehicle device i from the global model at the time t+1.

Further, the historical behavior of the vehicle device i in step 2 is calculated through the following formula:

$$H_i^{t+1} = \sum_{t=1}^{N} E(Q_i^t) \cdot s_i^t$$

where $$s_i^t$$

is a binary number, when $$s_i^t$$

is 1, it indicated that the local model of the vehicle device i is used at the time t; otherwise, $$s_i^t$$

is 0;

$$Q_i^t$$

represents the quality of the local model of the vehicle device i at the time t; and an operation E(·) represents a sigmoid function operation.

Furthermore, the contribution degree score $$u_i^{t+1}$$

of the local model $$\omega_i^t$$

step 2 is obtained through the following formula:

$$u_i^{t+1} = \left[\gamma \cdot Q_i^{t+1} + (1-\gamma) \cdot H_i^{t+1}\right] \cdot \left[1 - \cos\left(\omega_p^{t+1} - \omega^t, \nabla \omega_i^{t+1}\right)\right]$$

where $$\cos\left(\omega_p^{t+1} - \omega^t, \nabla \omega_i^{t+1}\right)$$

represents a cosine similarity between difference values of $$\omega_p^{t+1} - \omega^t \text{ and } \nabla \omega_i^{t+1}, \omega_p^{t+1} - \omega^t$$

is a difference value between the local model $$\omega_i^t$$

and the global model at the time t, and $$\nabla\omega_i^{t+1}$$

is a difference value between the local model and the time t+1 and the vehicle device i at the time t;

if the contribution degree score $$u_i^{t+1}$$

of the local model $$\omega_i^t$$

is greater than 0, it is added to an aggregation list $$G_j^{t+1};$$

and the contribution degree score $$u_i^{t+1}$$

of the local model $$\omega_i^t$$

is normalized through the following formula to obtain an aggregated weight $$\mu_i^{t+1}$$

of the contribution degree score $$u_i^{t+1}$$

of the local model $$\omega_i^t;$$

$$\mu_i^{t+1} = \frac{u_1^{t+1}}{\sum_{G_j^{t+1}} u_i^{t+1}}.$$

Furthermore, aggregating the local model set $$\{\omega_1^{t+1}, \omega_2^{t+1}, \omega_3^{t+1}, \ldots, \omega_i^{t+1}\}$$

to obtain the model $$\omega_j^{t+1}$$

of the edge cloud server j at the time t+1 in step 2 includes the following content:

aggregation is performed using the following formula to obtain the model $$\omega_j^{t+1}$$

or the edge cloud server j at the time t+1:

$$\omega_j^{t+1} = \sum_{G_j^{t+1}} \mu_i^{t+1} \cdot \omega_i^{t+1}.$$

Furthermore, the central cloud server aggregating a received edge cloud model $$\{\omega_1^{t+1}, \omega_2^{t+1}, \omega_3^{t+1}, \ldots, \omega_j^{t+1}\}$$

to obtain a global model $$\omega^{t+1}$$

at time t+1 in step 3 includes the following content:

the central cloud server collects the model $$\omega_j^{t+1}$$

of the edge cloud server j at the time t+1, the model $$\omega_j^{t+1}$$

of the edge cloud server j at the time t+1 is considered through the following formula and the quality contribution degree score $$\beta_j^{t+1}$$

of the model $$\omega_j^{t+1}$$

of the edge cloud server j at the time t+1 is obtained:

$$\beta_j^{t-1} = f(\omega_j^{t+1}; (x_s, y_s)) \cdot \sum_{G_j^{t+1}} Q_i^{t+1}$$

where $$f(\omega_j^{t+1}; (x_s, y_s))$$

represents the performance of the model $$\omega_j^{t+1}$$

of the edge cloud server j at the time t+1 in the test set of the central cloud server;

if the quality contribution degree score $$\beta_j^{t+1}$$

is greater than β', it is added to the aggregation list $G^{t+1}$; and the quality contribution score $$\beta_j^{t+1}$$

is normalized through the following formula to obtain the aggregated weight;

$$\beta_j^{t+1} = \frac{\beta_j^{t+1}}{\sum_{G^{t+1}} \beta_j^{t+1}};$$

and the central cloud server aggregates a received local model $$\{\omega_1^{t+1}, \omega_2^{t+1}, \omega_3^{t+1}, \ldots, \omega_j^{t+1}\}$$

using the aggregated weight to obtain a global model $$\omega^{t+1} = \sum_{G^{t+1}} \beta_j^{t+1} \cdot \omega_j^{t+1}$$

at the time t+1.

In a second aspect, the disclosure provides an electronic device, including a memory and a processor. The memory stores a computer program, and the processor is configured to execute the cybertwin-based method for constructing the two-layer federated learning framework for the internet of vehicles via the computer program.

In a third aspect, the disclosure provides a computer-readable storage medium. The computer-readable storage medium includes a computer program stored thereon. When running, the computer program executes the cybertwin-based method for constructing the two-layer federated learning framework for the internet of vehicles.

Compared with the prior art, the disclosure has the following advantageous effects.

In the disclosure, in response to the deficiencies of the existing robust federated learning, improvement is made, and a two-layer federated learning framework for internet of vehicles is constructed. A cybertwin network framework of the federated learning model for the internet of vehicles is divided into three layers: a central cloud server, an edge cloud server j and a vehicle device i, with the central cloud server attached to a server preset in the central cloud server, and the edge cloud server j attached to a roadside unit preset in the vehicle device i.

The vehicle device i trains the local model $$\omega_i^t$$

using the local dataset and sends same to the edge cloud server j. The edge cloud server j obtains a local model set $$\{\omega_1^{t+1}, \omega_2^{t+1}, \omega_3^{t+1}, \ldots, \omega_i^{t+1}\}$$

submitted by the vehicle device i within a range of the roadside unit, and aggregates the local model set $$\{\omega_1^{t+1}, \omega_2^{t+1}, \omega_3^{t+1}, \ldots, \omega_i^{t+1}\}$$

to obtain a model $$\omega_j^{t+1}$$

of the edge cloud server j at the time t+1. The central cloud server receives an edge cloud model $$\{\omega_1^{t+1}, \omega_2^{t+1}, \omega_3^{t+1}, \ldots, \omega_j^{t+1}\}$$

and aggregates same to obtain a global model $\omega^{t+1}$ at the time t+1. The federated learning scenarios are expanded, and more applicable and capable of resisting more backdoor attacks. The robustness of the global model is enhanced, and the maximum error-tolerant rate of malicious nodes is enhanced, making the global model suitable for more application scenarios.

BRIEF DESCRIPTION OF THE DRAWINGS

FIG. 1 is a schematic diagram of a cybertwin-based method for constructing a two-layer federated learning framework for internet of vehicles according to the disclosure.

DETAILED DESCRIPTION OF THE EMBODIMENTS

The implementations of the disclosure are described by reference to the attached drawings and preferred embodiments, and other advantages and effects of the disclosure can be readily understood by those skilled in the art from the contents disclosed in the specification. The disclosure can also be implemented or applied in different specific embodiments, and various details in the specification can be modified or altered in various ways on the basis of different viewpoints and applications without departing from the spirit of the disclosure. It is to be understood that the preferred embodiments are used solely to illustrate rather than limiting the scope of the disclosure.

It is to be noted that the diagrams provided in the following embodiments merely illustrate the fundamental concept of the disclosure in a schematic manner. Therefore, only components relevant to the disclosure are shown in the diagrams, and the diagrams are not drawn according to the actual number, shape, and size of components during implementation. In practical implementation, the form, quantity, and proportion of each component can be altered arbitrarily, and the layout of the components can also be more complex.

Term Explanation

RSU, the abbreviation for road side unit, literally means a roadside unit. In the electronic toll collection (ETC) system, RSU is an apparatus installed on the roadside and utilizes dedicated short range communication (DSRC) technology to communicate with the on board unit (OBU) in vehicles, achieving vehicle identification and electronic deduction of tolls. In highway and parking lot management, RSU is installed on the roadside to establish unmanned, fast, and dedicated lanes.

Embodiment

An embodiment provides a cybertwin-based method for constructing a two-layer federated learning framework for internet of vehicles. Referring to FIG. 1, an edge cloud server j is deployed between a vehicle device i and a central cloud server to build a two-layer federated learning system for internet of vehicles. The vehicle device i, the edge cloud server j and the central cloud server collaborate to complete model training. The vehicle device i, the edge cloud server j and the central cloud server communicate via a wireless link.

The following steps are specifically included.

Step 1: a two-layer federated learning system for internet of vehicles is constructed, and a cybertwin network framework of a federated learning model for the internet of vehicles is divided into three layers: the central cloud server, the edge cloud server j and the vehicle device i, with the central cloud server attached to a server preset in the central cloud server, and the edge cloud server j attached to a roadside unit preset in the vehicle device i;

the central cloud server signs with its preset private key $S_G$, encrypts a global model $\omega^t$ at a time t with a preset public key $P_j$ corresponding to the edge cloud server j, and sends same to the edge cloud server j; and the edge cloud server j decrypts an encrypted global model $\omega^t$ at the time t with its preset private key $S_j$ to obtain a decrypted global model $\omega^t$, ensuring the communication security between the edge cloud server j and the central cloud server; and each edge cloud server j collects a list $$N_j^t = \{1, 2, 3, \ldots, i\}$$

of the vehicle device i and sends the global model $\omega^t$ to the vehicle device i.

Step 2: the vehicle device i trains a local model $$\omega_i^t$$

using a local dataset and sends same to the edge cloud server j, the edge cloud server j acquires a historical behavior of the vehicle device i by calculating a contribution degree score of the local model $$\omega_i^t$$

and by a cybertwin node, and the local model $$\omega_i^t$$

that does not meet the requirements of a preset model is discarded to obtain an edge cloud model $$\omega_i^{t+1}$$

at a time t+1; the local model $$\omega_i^t$$

that odes not meet the requirements of the preset model is: the local model $$\omega_i^t$$

not within a preset historical behavior, or, the local model, $$\omega_i^t$$

not within a preset contribution degree score, or, the local model $$\omega_i^t$$

not within a preset quality;

within the time h, the vehicle device i signs with the private key $S_i$, encrypts the local model $$\omega_i^{t+1}$$

at the time t+1 with the public key $P_G$ corresponding to the edge cloud server j, and sends same to the roadside unit;

the edge cloud server j obtains a local model set $$\{\omega_1^{t+1}, \omega_2^{t+1}, \omega_3^{t+1}, \ldots \omega_i^{t+1}\}$$

submitted by the vehicle device i within a range of the roadside unit, and aggregates the local model set $$\{\omega_1^{t+1}, \omega_2^{t+1}, \omega_3^{t+1}, \ldots \omega_i^{t+1}\}$$

to obtain a model $$\omega_j^{t+1}$$

of the edge cloud server j at the time t+1; and the edge cloud server j signs with its private key $S_j$, encrypts the local model $$\omega_j^{t+1}$$

with the public key $P_G$ of the central cloud server, and sends same to the central cloud server.

Step 3: the central cloud server aggregates a received edge cloud model $$\{\omega_1^{t+1}, \omega_2^{t+1}, \omega_3^{t+1}, \ldots , \omega_j^{t+1}\}$$

to obtain a global model $\omega^{t+1}$ at the time t+1.

Step 4: steps 1-3 are repeated until the end of a global iteration, to obtain a final global model $\omega^T$.

As a preferred technical solution, in the embodiment, the local dataset for training in step 2 is generated by the vehicle device i via information acquisition. To reduce a transmission pressure of a backhaul link, the vehicle device i only communicates with the edge cloud server j, and the edge cloud server j can communicate with both the vehicle device i and the cloud server.

As a preferred technical solution, in the embodiment, the vehicle device i training a local model $$\omega_i^t$$

with the local dataset in step 2 includes the following content:

- assuming that a multi-classification task is currently carried out, the global model $\omega^0$, a learning rate $\eta$ of the vehicle device i, a local training epoch k, and a global iteration epoch T are initialized;
  - after receiving an initialized global model $\omega^0$, the vehicle device i trains the global model $\omega^0$ via a local dataset $(x_i, y_i)$ to obtain the local model $$\omega_i^{t+1}$$

at the time t+1, i.e., $$\omega_i^{t+1} = \omega^t - \eta\nabla 1[\omega^t; (x_i, y_i)];$$

taking the edge cloud server j as an example, after obtaining $$\{\omega_1^{t+1}, \omega_2^{t+1}, \omega_3^{t+1}, \ldots \omega_i^{t+1}\},$$

its contribution degree and historical behavior are calculated; and the edge cloud server j acquires the calculation capacity of the vehicle device i through the following formula:

$$C_i^{t+1} = \frac{a_i^{t+1} \cdot f_i^{t+1}(\omega_i^{t+1}; (x_i, y_i))}{A^{t+1} \cdot D_i^{t+1}}$$

$$D_i^{t+1} = \frac{1}{2}[((x_i, y_i)\|M)_{KL} + ((x_j, y_j)\|M)_{KL}]$$

where $A^{t+1}$ represents a reference value of a data volume of the vehicle device i at the time t, and the specific values depend on different tasks; $a^{t+1}$ represents a data volume of the vehicle device i at the time $$t + 1; f_i^{t+1}(\omega_i^{t+1}; (x_i, y_i))$$

represents the model quality performance of the local model on a local test set; and $$D_i^{t+1}$$

represent a JS divergence or test sets of the vehicle device i and the edge cloud server j.

It can be understood that the data volume refers to the size of the dataset possessed by the vehicle device i. For example, in the multi-classification image recognition, it is a common data distribution pattern where assuming that a vehicle device iA has 3000 images, and a vehicle device iB has 2000 images. When training the local model, the dataset is divided into a training set and a test set, with the local test set being the test set used during training.

As a preferred technical solution, in the embodiment, after the vehicle device i trains the local model $$\omega_i^t$$

of using the local dataset in step 2, the following is further included:

the quality of the local model of the vehicle device i is calculated through the following formula:

$$Q_i^{t+1} = \alpha \cdot C_i^{t+1} \cdot e^{loss_i^{t+1}} + (1-\alpha) \cdot e(\omega_i^{t+1}; \omega^t)$$

$$\text{loss}_i^{t+1} = \frac{\text{loss}(\omega_i^{t+1}; (x_j, y_j)) - \text{loss}(\omega^t; (x_j, y_j))}{\text{loss}(\omega^t; (x_j, y_j))}$$

$$e(\omega_1^{t+1}, \ldots , \omega_{i-1}^{t+1}, \omega_i^{t+1}) = \frac{1}{1 + e^{-2(cos(\omega_i^{t+1}, \omega^t)) - cos^t}}$$

where α represents a slippage factor;

$$\mathrm{loss}_i^{t+1}$$

represents a contribution degree of the vehicle device i to the global model at the time t+1; and $$e(\omega_i^{t+1};\omega^t)$$

represents a distance or the vehicle device i from the global model at the time t+1.

As a preferred technical solution, in the embodiment, the historical behavior of the vehicle device i is calculated through the following formula in step 2:

$$H_i^{t+1}=\sum_{t=1}^{N}E(Q_i^t)\cdot s_i^t$$

where $$s_i^t$$

is a binary number, when $$s_i^t$$

is 1, is indicated that the local model of the vehicle device i is used at the time t; otherwise, $$s_i^t$$

is 0;

$$Q_i^t$$

represents the quality of the local model of the vehicle device i at the time t; and an operation E(·) represents a sigmoid function operation, making an event closer to the current time more meaningful for reference.

As a preferred technical solution, in the embodiment, the contribution degree score $$u_i^{t+1}$$

of the local model $$\omega_i^t$$

is obtained through the following formula in step 2:

$$u_i^{t+1}=\left[\gamma\cdot Q_i^{t+1}+(1-\gamma)\cdot H_i^{t+1}\right]\cdot\left[1-\cos\left(\omega_p^{t+1}-\omega^t,\nabla\omega_i^{t+1}\right)\right]$$

where $$\cos\left(\omega_p^{t+1}-\omega^t,\nabla\omega_i^{t+1}\right)$$

represents a cosine similarity between difference values of $$\omega_p^{t+1}-\omega^t \text{ and } \nabla\omega_i^{t+1},\ \omega_p^{t+1}-\omega^t$$

is a difference value between the local model $$\omega_i^t$$

and the global model at the time t, and $$\nabla\omega_i^{t+1}$$

is a difference value between the local model at the time t+1 and the vehicle device i at the time t; and if the contribution degree score $$u_i^{t+1}$$

of the local model is greater than 0, is it added to an aggregation list $$G_j^{t+1};$$

and the contribution degree score $$u_i^{t+1}$$

of the local model $$\omega_i^t$$

is normalized through the following formula to obtain an aggregated weight $$\mu_i^{t+1}$$

of the contribution degree score $$u_i^{t+1}$$

of the local model $$\omega_i^t;$$

$$\mu_i^{t+1}=\frac{u_i^{t+1}}{\sum_{G_j^{t+1}}u_i^{t+1}}.$$

As a preferred technical solution, in the embodiment, aggregating the local model set $$\{\omega_1^{t+1},\omega_2^{t+1},\omega_3^{t+1},\ldots\,\omega_i^{t+1}\}$$

to obtain the model of the edge cloud server j at the time t+1 in step 2 includes the following content:

aggregation is performed using the following formula to obtain the model $$\omega_j^{t+1}$$

of the edge cloud server j at the time t+1:

$$\omega_j^{t+1}=\sum_{G_j^{t+1}}\mu_i^{t+1}\cdot\omega_i^{t+1}.$$

As a preferred technical solution, in the embodiment, the central cloud server aggregating a received edge cloud model $$\{\omega_1^{t+1},\omega_2^{t+1},\omega_3^{t+1},\ldots,\omega_j^{t+1}\}$$

to obtain a global model $\omega^{t+1}$ at the time t+1 in step 3 includes the following content:

the central cloud server collects the model $$\omega_j^{t+1}$$

of the edge cloud server j at the time t+1; and the model of the edge cloud server j at the time t+1 is considered through the following formula and the quality contribution degree score $$\beta_j^{t+1}$$

of the model $$\omega_j^{t+1}$$

of the edge cloud server j at the time t+1 is obtained:

$$\beta_j^{t+1}=f\left(\omega_j^{t+1};(x_s,y_s)\right)\cdot\sum_{G_j^{t+1}}Q_i^{t+1}$$

where $$f\left(\omega_j^{t+1};(x_s,y_s)\right)$$

represents the performance of the model $$\omega_j^{t+1}$$

of the edge cloud server j at the time t+1 in the test set of the central cloud server, ensuring that even if a certain edge cloud server j breaks down, recognition can be performed in the central cloud server;

if the quality contribution degree score $$\beta_j^{t+1}$$

is greater than β', it is added to the aggregation list $G^{t+1}$; and the quality contribution score $$\beta_j^{t+1}$$

is normalized using the following formula to obtain the aggregated weight;

$$\beta_j^{t+1}=\frac{\beta_j^{t+1}}{\sum_{G^{t+1}}\beta_j^{t+1}};$$

and the central cloud server aggregates a received local model $$\{\omega_1^{t+1},\omega_2^{t+1},\omega_3^{t+1},\ldots,\omega_j^{t+1}\}$$

using the aggregated weight to obtain a global model $$\omega^{t+1}=\sum_{G^{t+1}}\beta_j^{t+1}\cdot\omega_j^{t+1}$$

at the time t+1.

It is to be noted that the vehicle device i in the disclosure can be devices of Internet of Things such as a vehicle.

In another embodiment of the disclosure, an electronic device is further provided, including: one or more processors; and a store apparatus, configured to store one or more programs. When the one or more programs are executed by the one or more processors, the method as described in any one of the embodiments of the disclosure is implemented.

In the embodiment, a computer system of the electronic device suitable for implementing the disclosure includes a central processing unit (CPU), which can execute various appropriate actions and processes according to a program stored in a read-only memory (ROM) or a program loaded from a storage part into a random access memory (RAM), such as executing the method described in the above-described embodiment. Various programs and data necessary for the operation of the electronic device are further stored in RAM. CPU, ROM and RAM are connected to each other via a bus. An input/output (I/O) interface is also connected to the bus.

The following components are connected to the I/O interface: an input part including a keyboard, mouse, etc.; an output part including a cathode ray tube (CRT), a liquid crystal display (LCD), and a speaker, etc.; a storage part including a hard disk, etc.; and a communication part including network interface cards such as a local area network (LAN) card and a modem. The communication part performs communication processing via a network such as the internet. A driver is also connected to the I/O interface as needed. A removable medium, such as a magnetic disk, an optical disk, a magneto-optical disk, and a semiconductor memory, is mounted on the driver as needed, enabling a computer program read therefrom to be mounted into the storage part as needed.

In particular, according to the embodiments of the disclosure, the process described above can be implemented as a computer software program. For example, an embodiment of the disclosure includes a computer program product, which includes a computer program carried on a computer-readable medium. The computer program includes a computer program for performing the method shown in the flowchart. In such embodiments, the computer program can be downloaded from and installed on a network via the communication part, and/or installed on the detachable medium. When the computer program is executed by CPU, it performs various functions as defined in the system of the disclosure.

It is to be noted that although several modules or units of the device for performing actions have been mentioned in the detailed description above, such a division is not mandatory. In fact, according to the implementations of the disclosure, the features and functions of two or more modules or units described above can be embodied in a single module or unit. Conversely, the features and functions of one module or unit described above can be further divided and embodied by multiple modules or units.

In the embodiment, the disclosure further provides a computer-readable storage medium, which stores a computer program thereon. When the computer program is executed by the processor of the computer, the computer executes the method as described in any one of the embodiments. The computer-readable storage medium can be contained in the electronic device as described in the above embodiment, or can stand alone and not be assembled into such electronic device.

Through the above description of the implementation, a person skilled in the art can readily understand that the exemplary implementation can be realized by software and by combining software with necessary hardware. Therefore, the technical solutions according to the embodiments of the disclosure can be embodied in the form of a software product, which can be stored in a non-volatile storage medium (such as a CD-ROM, USB flash drive, and portable hard drive) or on a network. The software product includes several instructions that enable a computing device (which can be a personal computer, server, touch-controlled terminal, network device, etc.) to execute the method according to the implementation of the disclosure.

The implementation of the embodiments of the disclosure has the following beneficial effects:

1) The technical Problem to be Solved by the Creation of the Disclosure

In the internet of vehicles, the complex communication, different data structures, and various backdoor attacks increase the difficulty of model aggregation. Therefore, it is necessary to design a new federated learning framework to expand the tolerance ratio for malicious nodes, design a new federated learning method to improve the stability of the model against multiple backdoor attacks, and ensure the robustness of the model in complex communication.

2) The Technical Solutions Used to Solve the Technical Problem

In the disclosure, multiple key factors in the field of the internet of vehicles are comprehensively considered, to address complex challenges such as various backdoor attacks present in data acquisition and model training for intelligent vehicle device i. In the disclosure, to optimize the aggregation process of the local model, on the basis of considering the distances among models and the degree of data heterogeneity of the vehicle device i, the local model set $$\{\omega_1^{t+1}, \omega_2^{t+1}, \omega_3^{t+1}, \ldots, \omega_i^{t+1}\}$$

is aggregated to obtain the model $$\omega_j^{t+1}$$

of the edge cloud server j at the time t+1. The disclosure can reasonably reflect the performance and data quality of each local model, so as to ensure that the contribution of each local model is accurately evaluated and effectively utilized. Meanwhile, by considering the contribution of the vehicle device i to the global model, the number and weights of vehicle devices i participating in training can be dynamically adjusted, so that the contributing devices can be utilized in maximum to improve the performance of the global model. In response to the communication complexity of vehicle device i, the federated learning framework of the disclosure is employed to reduce the unreliability caused by communication complexity and enhance the maximum tolerance proportion for malicious nodes. The cybertwin network framework is thoroughly considered for its application in the internet of vehicles, thereby effectively enhancing the applicability and robustness of federated learning models for the internet of vehicles.

Obviously, the above-described embodiments of the disclosure are merely used to clearly describe the disclosure, rather than limiting the implementations of the disclosure. For an ordinary person skilled in the art, various other forms of changes or modifications can be made on the basis of the above description. It is neither necessary nor feasible to fully list all possible implementations herein. Any modifications, equivalents and improvements made within the spirit and principle of the disclosure are included in the scope of the claims of the disclosure.

The invention claimed is:

1. A cybertwin-based method for constructing a two-layer federated learning framework for internet of vehicles, comprising deploying an edge cloud server j between a vehicle device i and a central cloud server to build a two-layer federated learning system for internet of vehicles; the vehicle device i, the edge cloud server j and the central cloud server collaborating to complete model training; and the vehicle device i, the edge cloud server j and the central cloud server being communicated via a wireless link; and specifically comprising the following steps:

step 1: constructing a two-layer federated learning system for the internet of vehicles, dividing a cybertwin network framework of a federated learning model for the internet of vehicles into three layers: the central cloud server, the edge cloud server j and the vehicle device i, with the edge cloud server j attached to a roadside unit preset in the vehicle device i, wherein the central cloud server signs with its preset private key $S_G$, encrypts a global model $\omega^t$ at a time t with a preset public key $P_j$ corresponding to the edge cloud server j, and sends same to the edge cloud server j; and the edge cloud server j decrypts an encrypted global model $\omega^t$ at the time t with its preset private key $S_j$ to obtain a decrypted global model $\omega^t$, ensuring the communication security between the edge cloud server j and the central cloud server; and each edge cloud server j collects a list $$N_j^t = \{1, 2, 3, \ldots, i\}$$

of the vehicle device i and sends the global model $\omega^t$ to the vehicle device i;

step 2: the vehicle device i training a local model $$\omega_i^t$$

using a local dataset and sending same to the edge cloud server j, the edge cloud server j acquiring a historical behavior of the vehicle device i by calculating a contribution degree score of the local model $$\omega_i^t$$

and by a cybertwin node, and discarding the local model $$\omega_i^t$$

that does not meet the requirements of a preset model, to obtain an edge cloud model $$\omega_i^{t+1}$$

at a time t+1, the local model $$\omega_i^t$$

that does not meet the requirements of the preset model being: the local model $$\omega_i^t$$

not within a preset historical behavior, or, the local model $$\omega_i^t$$

not within a preset contribution degree score, or, the local model $$\omega_i^t$$

not within a preset quality, wherein the vehicle device i signs with the private key $S_i$, encrypts the local model $$\omega_i^{t+1}$$

at the time t+1 with a public key $P_G$ corresponding to the edge cloud server j, and sends same to the roadside unit;

the edge cloud server j obtains a local model set $$\{\omega_1^{t+1}, \omega_2^{t+1}, \omega_3^{t+1}, \ldots \omega_i^{t+1}\}$$

submitted by the vehicle device i within a range of the roadside unit, and aggregates the local model set $$\{\omega_1^{t+1}, \omega_2^{t+1}, \omega_3^{t+1}, \ldots \omega_i^{t+1}\}$$

to obtain a model $$\omega_j^{t+1}$$

of the edge cloud server j at the time t+1; and the edge cloud server j signs with its private key $S_j$, encrypts the model $$\omega_j^{t+1}$$

of the edge cloud server j at the time t+1 with the public key $P_G$ of the central cloud server, and sends same to the central cloud server;

step 3: the central cloud server receiving an edge cloud model $$\{\omega_1^{t+1}, \omega_2^{t+1}, \omega_3^{t+1}, \ldots, \omega_i^{t+1}\}$$

and aggregating same to obtain a global model $\omega^{t+1}$ at the time t+1; and step 4: repeating steps 1-3 until the end of a global iteration, to obtain a final global model $\omega^T$.

2. The method according to claim 1, wherein the local dataset for training in step 2 is generated by the vehicle device i via a sensor and a locator; and to reduce a transmission pressure of a backhaul link and the scalability of an aggregation framework, the vehicle device i only communicates with the edge cloud server j, and the edge cloud server j communicates with both the vehicle device i and the cloud server.

3. The method according to claim 1, wherein the historical behavior of the vehicle device i in step 2 is calculated by the following formula:

$$H_i^{t+1} = \sum_{t=1}^{N} E(Q_i^t) \cdot s_i^t$$

where $$s_i^t$$

is a binary number, when $$s_i^t$$

is 1, it indicates that the local model of the vehicle device i is used at the time t; otherwise, $$s_i^t$$

is 0; $Q_i$ represents the quality of the local model of the vehicle device i at the time t; and an operation E(·) represents a sigmoid function operation.

4. The method according to claim 1, wherein the vehicle device i training the local model $$\omega_i^t$$

using the local dataset in step 2 comprises:

assuming that a multi-classification task is currently carried out, initializing a global model $\omega^0$, a learning rate η of the vehicle device i, a local training epoch k, and a global iteration epoch T;

after receiving the initialized global model $\omega^0$, the vehicle device i training the initialized global model $\omega^0$ via a local dataset $(x_i, y_i)$ to obtain the local model $$\omega_i^{t+1}$$

at time t+1, i.e., $$\omega_i^{t+1} = \omega^t - \eta \nabla l[\omega^t; (x_i, y_i)];$$

and the edge cloud server j acquiring the calculation capacity of the vehicle device i through the following formula:

$$C_i^{t+1} = \frac{a_i^{t+1} \cdot f_i^{t+1}(\omega_i^{t+1}; (x_i, y_i))}{A^{t+1} \cdot D_i^{t+1}}$$

$$D_i^{t+1} = \frac{1}{2}[((x_i, y_i)\|M)_{KL} + ((x_j, y_j)\|M)_{KL}]$$

where $A^{t+1}$ represents a reference value of a data volume of the vehicle device i at the time t, $a^{t+1}$ represents a data volume of the vehicle device i at the time t+1;

$$f_i^{t+1}(\omega_i^{t+1}; (x_i, y_i))$$

represents the model quality performance of the local model on a local test set; and $$D_i^{t+1}$$

represents a Jensen-Shannon (JS) divergence of test sets of the vehicle device i and the edge cloud server j.

5. The method according to claim 4, wherein after the vehicle device i trains the local model $$\omega_i^t$$

using the local dataset, step 2 further comprises:

calculating the quality of the local model of the vehicle device i through the following formula:

$$Q_i^{t+1} = \alpha \cdot C_i^{t+1} \cdot e^{loss_i^{t+1}} + (1-\alpha) \cdot e(\omega_i^{t+1}; \omega^t)$$

$$\text{loss}_i^{t+1} = \frac{\text{loss}\ (\omega_i^{t+1}; (x_j, y_j)) - \text{loss}\ (\omega^t; (x_j, y_j))}{\text{loss}\ (\omega^t; (x_j, y_j))}$$

$$e(\omega_1^{t+1}, \ldots, \omega_{i-1}^{t+1}, \omega_i^{t+1}) = \frac{1}{1 + e^{-2(cos(\omega_i^{t+1}, \omega^t)) - cos'}}$$

where α represents a slippage factor;

$$\text{loss}_i^{t+1}$$

represents a contribution degree of the vehicle device i to the global model at the time t+1; and $$e(\omega_i^{t+1}; \omega^t)$$

represents a distance of the vehicle device i from the global model at the time t+1.

6. The method according to claim 5, wherein a contribution degree score $$u_i^{t+1}$$

of the local model $$\omega_i^t$$

is obtained in step 2 through the following formula:

$$u_i^{t+1} = \left[\gamma \cdot Q_i^{t+1} + (1-\gamma) \cdot H_i^{t+1}\right] \cdot \left[1 - \cos\left(\omega_p^{t+1} - \omega^t, \nabla \omega_i^{t+1}\right)\right]$$

where $$\cos\left(\omega_p^{t+1} - \omega^t, \nabla \omega_i^{t+1}\right)$$

represents a cosine similarity between difference values of $$\omega_p^{t+1} - \omega^t$$

and $$\nabla \omega_i^{t+1}, \omega_p^{t+1} - \omega^t$$

is a difference value between the local model $$\omega_i^t$$

and the global model at the time t, and $$\nabla \omega_i^{t+1}$$

is a difference value between the local model at the time t+1 and the vehicle device i at the time t;

if the contribution degree score $$u_i^{t+1}$$

of the local model $$\omega_i^t$$

is greater than 0, it is added to an aggregation list $$G_j^{t+1};$$

and the contribution degree score $$u_i^{t+1}$$

of the local model $$\omega_i^t$$

is normalized through the following formula to obtain an aggregated weight $$\mu_i^{t+1}$$

of the contribution degree score $$u_i^{t+1}$$

of the local model $$\omega_i^t;$$

$$\mu_i^{t+1} = \frac{u_i^{t+1}}{\sum_{G_j^{t+1}} u_i^{t+1}}.$$

7. The method according to claim 6, wherein the aggregating the local model set $$\left\{\omega_1^{t+1}, \omega_2^{t+1}, \omega_3^{t+1}, \ldots, \omega_1^{t+1}\right\}$$

to obtain the model $$\omega_j^{t+1}$$

of the edge cloud server j at the time t+1 in step 2 comprises:

performing aggregation through the following formula to obtain the model $$\omega_j^{t+1}$$

of the edge cloud server j at the time t+1:

$$\omega_j^{t+1} = \sum_{G_j^{t+1}} \mu_i^{t+1} \cdot \omega_i^{t+1}.$$

8. The method according to claim 5, wherein the central cloud server aggregating the received edge cloud model $$\{\omega_1^{t+1}, \omega_2^{t+1}, \omega_3^{t+1}, \ldots, \omega_j^{t+1}\}$$

to obtain the global model $$\omega^{t+1}$$

at the time t+1 in step 3 comprises:

the central cloud server collecting the model $$\omega_j^{t+1}$$

of the edge cloud server j at the time t+1, the model $$\omega_j^{t+1}$$

of the edge cloud server j at the time t+1 being considered through the following formula and a quality contribution degree score $$\beta_j^{t+1}$$

of the model $$\omega_j^{t+1}$$

of the edge cloud server j at the time t+1 being obtained:

$$\beta_j^{t+1} = f(\omega_j^{t+1}; (x_s, y_s)) \cdot \sum_{G_j^{t+1}} Q_i^{t+1}$$

where $$f(\omega_j^{t+1}; (x_s, y_s))$$

represents the performance of the model $$\omega_j^{t+1}$$

or the edge cloud server j at the time t+1 in a test set of the central cloud server;

if the quality contribution degree score $$\beta_j^{t+1}$$

is greater than β', it being added to the aggregation list $G^{t+1}$; and normalizing the quality contribution degree score $$\beta_j^{t+1}$$

through the following formula to obtain the aggregated weight;

$$\beta_j^{t+1} = \frac{\beta_j^{t+1}}{\sum_{G^{t+1}} \beta_j^{t+1}};$$

and the central cloud server aggregating a received local model $$\{\omega_1^{t+1}, \omega_2^{t+1}, \omega_3^{t+1}, \ldots, \omega_j^{t+1}\}$$

using the aggregated weight to obtain a global model $$\omega^{t+1} = \sum_{G^{t+1}} \beta_j^{t+1} \cdot \omega_j^{t+1}$$

at the time t+1.

9. An electronic device, the electronic device comprising a processor and a memory, wherein the memory stores at least one instruction, at least one segment of program, a code set or an instruction set, the at least one instruction, the at least one segment of program, the code set or the instruction set is loaded and executed by the processor, to implement the cybertwin-based method for constructing the two-layer federated learning framework for the internet of vehicles according to claim 1.

10. An electronic device, the electronic device comprising a processor and a memory, wherein the memory stores at least one instruction, at least one segment of program, a code set or an instruction set, the at least one instruction, the at least one segment of program, the code set or the instruction set is loaded and executed by the processor, to implement the cybertwin-based method for constructing the two-layer federated learning framework for the internet of vehicles according to claim 2.

11. An electronic device, the electronic device comprising a processor and a memory, wherein the memory stores at least one instruction, at least one segment of program, a code set or an instruction set, the at least one instruction, the at least one segment of program, the code set or the instruction set is loaded and executed by the processor, to implement the cybertwin-based method for constructing the two-layer federated learning framework for the internet of vehicles according to claim 3.

12. An electronic device, the electronic device comprising a processor and a memory, wherein the memory stores at least one instruction, at least one segment of program, a code set or an instruction set, the at least one instruction, the at least one segment of program, the code set or the instruction set is loaded and executed by the processor, to implement the cybertwin-based method for constructing the two-layer federated learning framework for the internet of vehicles according to claim 4.

13. An electronic device, the electronic device comprising a processor and a memory, wherein the memory stores at least one instruction, at least one segment of program, a code set or an instruction set, the at least one instruction, the at least one segment of program, the code set or the instruction set is loaded and executed by the processor, to implement the cybertwin-based method for constructing the two-layer federated learning framework for the internet of vehicles according to claim 5.

14. An electronic device, the electronic device comprising a processor and a memory, wherein the memory stores at least one instruction, at least one segment of program, a code set or an instruction set, the at least one instruction, the at least one segment of program, the code set or the instruction set is loaded and executed by the processor, to implement the cybertwin-based method for constructing the two-layer federated learning framework for the internet of vehicles according to claim 6.

15. An electronic device, the electronic device comprising a processor and a memory, wherein the memory stores at least one instruction, at least one segment of program, a code set or an instruction set, the at least one instruction, the at least one segment of program, the code set or the instruction set is loaded and executed by the processor, to implement the cybertwin-based method for constructing the two-layer federated learning framework for the internet of vehicles according to claim 7.

16. A computer-readable storage medium, the storage medium storing at least one instruction, at least one segment of program, a code set or an instruction set, the at least one instruction, the at least one segment of program, the code set or the instruction set is loaded and executed by a processor, to implement the cybertwin-based method for constructing the two-layer federated learning framework for the internet of vehicles according to claim 1.

17. A computer-readable storage medium, the storage medium storing at least one instruction, at least one segment of program, a code set or an instruction set, the at least one instruction, the at least one segment of program, the code set or the instruction set is loaded and executed by a processor, to implement the cybertwin-based method for constructing the two-layer federated learning framework for the internet of vehicles according to claim 2.

18. A computer-readable storage medium, the storage medium storing at least one instruction, at least one segment of program, a code set or an instruction set, the at least one instruction, the at least one segment of program, the code set or the instruction set is loaded and executed by a processor, to implement the cybertwin-based method for constructing the two-layer federated learning framework for the internet of vehicles according to claim 3.

19. A computer-readable storage medium, the storage medium storing at least one instruction, at least one segment of program, a code set or an instruction set, the at least one instruction, the at least one segment of program, the code set or the instruction set is loaded and executed by a processor, to implement the cybertwin-based method for constructing the two-layer federated learning framework for the internet of vehicles according to claim 4.

20. A computer-readable storage medium, the storage medium storing at least one instruction, at least one segment of program, a code set or an instruction set, the at least one instruction, the at least one segment of program, the code set or the instruction set is loaded and executed by a processor, to implement the cybertwin-based method for constructing the two-layer federated learning framework for the internet of vehicles according to claim 5.

* * * * *